(12) United States Patent
Fendt et al.

(10) Patent No.: US 6,419,262 B1
(45) Date of Patent: Jul. 16, 2002

(54) OCCUPANT PROTECTIVE DEVICE LOCATED IN THE STEERING WHEEL OF A MOTOR VEHICLE

(75) Inventors: Günter Fendt; Hermann Küblbeck; Peter Steiner, all of Schrobenhausen; Helmut Steurer, Gerolsbach-Junkenhofen; Armin Vogl, Aibach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/787,210
(22) PCT Filed: Jul. 4, 2000
(86) PCT No.: PCT/EP00/06210
§ 371 (c)(1), (2), (4) Date: May 23, 2001
(87) PCT Pub. No.: WO01/05631
PCT Pub. Date: Jan. 25, 2001

(30) Foreign Application Priority Data

Jul. 15, 1999 (DE) .......................................... 199 32 696

(51) Int. Cl.[7] ................................................. B60R 21/24
(52) U.S. Cl. ..................................... 280/729; 280/743.1
(58) Field of Search .............................. 280/728.1, 729, 280/743.1, 743.2, 731

(56) References Cited

U.S. PATENT DOCUMENTS

| | | | |
|---|---|---|---|
| 3,752,501 A | * | 8/1973 | Daniel et al. |
| 3,795,414 A | | 3/1974 | Ventre et al. |
| 4,136,894 A | * | 1/1979 | Ono et al. |
| 5,308,113 A | * | 5/1994 | Moriset |
| 5,529,337 A | * | 6/1996 | Takeda et al. |
| 6,308,983 B1 | * | 10/2001 | Sinnhuber ................... 280/735 |

FOREIGN PATENT DOCUMENTS

| | | |
|---|---|---|
| DE | 2 103 194 | 9/1971 |
| DE | 38 09 074 | 10/1980 |
| DE | 297 07 162 | 7/1987 |
| DE | 38 29 368 | 3/1990 |
| DE | 40 11 492 | 10/1991 |

(List continued on next page.)

Primary Examiner—Avraham H. Lerner
(74) Attorney, Agent, or Firm—Venable; Norman N. Kunitz

(57) ABSTRACT

Conventional airbag apparatuses have a very large volume for offering the greatest possible protection for the passenger, and therefore block the driver's view of the traffic situation and preclude further steering actions. Additionally, the passenger is endangered if he is in an atypical sitting position. Multi-stage airbag systems permit an adaptation of the degree of deployment to the size and/or position of the passenger, but are very complicated and slow. Proposed is a passenger-protection apparatus having a first airbag for a first stage of deployment, and a second airbag for a second stage of deployment, which occurs after and independently of the first, with the shape of the first airbag and the quantity of gas supplied to it being determined such that, when filled with this quantity of gas, the first airbag has a collision zone that corresponds to the diameter of the steering wheel, and has a short expansion length in the direction of the passenger, in relation to the distance between the collision zone and the passenger. A second airbag, which can be deployed independently, laterally surrounds the first airbag, partially or preferably completely, in the manner of a hose in the filled state, and compresses the first airbag, so the expansion length of the first airbag increases. Whereas the first airbag is deployed early and independently of the position of the passenger, the second airbag can be filled afterward with different quantities of gas when a second acceleration threshold is exceeded, as a function of the position and/or size of the passenger, by a controllable gas source, which can preferably be deployed in stages, thereby establishing the shape of the two airbags and the deformation of the first airbag.

19 Claims, 4 Drawing Sheets

FOREIGN PATENT DOCUMENTS

| | | |
|---|---|---|
| DE | 40 19 677 | 1/1992 |
| DE | 40 23 109 | 1/1992 |
| DE | 41 29 314 | 3/1992 |
| DE | 92 11 421 | 3/1993 |
| DE | 43 20 147 | 1/1994 |
| DE | 196 10 833 | 9/1996 |
| DE | 196 28 837 | 1/1997 |
| DE | 195 41 924 | 5/1997 |
| DE | 297 00 804 | 5/1997 |
| DE | 196 11 718 | 10/1997 |
| DE | 197 03 945 | 6/1998 |
| DE | 198 16 075 | 10/1999 |
| DE | 198 16 989 | 11/1999 |
| EP | 0 657 329 | 6/1995 |
| FR | 71.22625 | 2/1973 |
| JP | 3 32956 | 2/1991 |

* cited by examiner

OCCUPANT PROTECTIVE DEVICE LOCATED IN THE STEERING WHEEL OF A MOTOR VEHICLE

BACKGROUND OF THE INVENTION

The invention relates to a passenger-protection apparatus in the steering wheel of a motor vehicle.

Passenger-protection devices having a plurality of stages that can be deployed independently of one another, some having multi-chamber gas bags, are known from, for example, DE 195 41 924 A1, DE 196 11 718 A1 or DE 198 16 989 A1. In these instances, the level of the protective effect, particularly the inflation volume, is tailored to the severity of the accident.

A further type of passenger-protection apparatus having the function of protecting the passenger temporarily after the actual airbag deflates is known from, for example, DE 38 29 368 A1, DE 38 33 888 A1 or 92 11 421 U1. Gas-bag restraint systems of this nature have a gas bag with two chambers, with the first, larger chamber surrounding the second chamber, as shown in FIG. 5 of the present application. The first and second chambers must therefore be deployed simultaneously. The first chamber is limited by a wall made of a material having a greater gas permeability than the material limiting the second chamber. After the inflation, the inside, second chamber remains tautly filled longer, and, at least to some extent, protects the driver in the event of a second collision, particularly against the gas generator, which would otherwise be exposed once the first airbag has already deflated. The overlapping of the first and second chambers is disadvantageous from a manufacturing standpoint, and only permits the common deployment of the two airbags.

DE 41 29 314 A1 describes an airbag safety system in which, in addition to a first airbag for the driver, which has a first deployment device, a second airbag is provided for the passenger, which has a second deployment device; a third deployment device, which is delay-activated after the second deployment device, is also provided for the second airbag.

Passenger-protection apparatuses having an asymmetrical shape for providing the passenger with the greatest possible protection are known from DE 197 03 945 A1, JP 03-32956 and DE 297 00 804 U1.

In DE 197 03 945 A1, a plurality of superposed airbags is deployed simultaneously and filled with propellant in stages, as a function of their unimpeded expansion in the passenger space. The inflation process is supposed to be controlled as a function of the position and movement of the passenger, and the passenger's head is also protected laterally. Controlling the filling procedure as a function of the unimpeded expansion is highly complicated, and does not appear feasible due to the extremely short filling time of a few milliseconds.

JP 03-32956 A1 describes a passenger-protection apparatus having a central, small gas bag with a conventional expansion length, and two external gas bags having a larger expansion length that offers lateral protection for the passenger's head; the gas bags are filled simultaneously and from the same gas source. The gas bags are also connected among themselves by restraining straps, so a separate deployment is technically impossible.

In contrast, DE 297 00 804 U1 describes a wedge shape of the passenger-protection apparatus that becomes larger from the torso region to the head region.

A further problem in the activation of passenger-protection systems, which is known, for example, from DE 43 20 147 A1, is that the airbags are oriented with respect to a passenger who is assuming a predetermined restrained position, but at the moment of the accident, and the activation of the airbag, the passenger may be in a different position. If this airbag is immediately and fully activated during a crash, the very small initial distance between the airbag and the vehicle passenger may result in undesirable stress on the passenger. DE 43 20 147 A1 is intended to orient the passenger to the desired position by means of a first airbag stage, which means, however, that the passenger is also subjected to not entirely non-critical stress; furthermore, this orientation is hardly possible within the short time until the passenger impacts the front region, such as the steering wheel.

The "out-of-position" passenger problem has also given rise to passenger-protection apparatuses that are described in, for example, DE 38 09 074 C2, DE 40 19 677 A1 or DE 40 23 109 A1, in which the sitting position of the relevant passenger in relation to the associated passenger-protection apparatuses is measured continuously. The times and/or the scope of the protective measures to be implemented are derived from these measurements.

If, however, the sitting position of the passenger must first be determined at the moment of the collision before an airbag can be deployed, a portion of the delay path remains unutilized.

In an analogous situation, DE 297 07 162 U1 describes a gas bag having at least one restraining strap with a tear-away seam; in an "out-of-position" scenario, the gas bag is deployed as a function of the supplied gas pressure or gas quantity and reaches a first size, with the tear-away seams still being connected to the restraining straps, but then tearing due to a higher gas pressure or a larger gas quantity; the restraining straps keep the gas bag at a second size.

DE 196 28 837 A1 discloses an airbag in which the expansion length of a plurality of chambers increases in the direction of the passenger, that is, further gas bags are filled by means of laterally-extending supply hoses in the direction of the passenger in front of the first gas bag. The technical outlay for this feature is considerable, and positioning the additional gas bags is problematic.

DE 40 11 492 A1 also presents a passenger-protection apparatus in the steering wheel of a motor vehicle; in this case, at least one of the gas sources is disposed outside of the steering wheel, and the gas is supplied to the airbag disposed in the steering wheel by way of a pressure line. Gas sources considered for this apparatus are pyrotechnically-activated gas generators and compressed-gas cartridges, particularly those whose available gas quantities are metered by way of valves and distributors, and can be conducted into different airbags.

DE-OS 2 103 194 proposes providing a safety apparatus with an individual airbag that can be filled with compressed air from a compressed-air generator or container; when an impending collision is detected by so-called pre-crash sensors, the airbag is only partially filled, then completely filled upon impact. Otherwise, the partly-filled airbag must be emptied after a predetermined time.

A drawback of known passenger-protection apparatuses that employ airbags is that, without exception, the bags must possess a very large volume to offer the highest level of protection for the passenger, and thereby block the driver's view of the traffic situation and prevent further steering actions. Airbags typically have a larger diameter than the actual steering wheel to be covered, as well as a relatively large expansion length in the direction of the driver. The driver can no longer see, and can no longer manipulate the steering wheel.

For this reason, in large-volume airbags, the deflation process must also be effected very rapidly by means of large discharge openings. This, again, stipulates a precise temporal determination of the deployment time, because if the airbag is deployed too early, the passenger is no longer adequately protected, whereas if the airbag is deployed too late, the passenger may be additionally injured.

It is the object of the invention to provide a technically simpler passenger-protection apparatus that permits an early, rapid protection of the passenger without severely impeding the driver's reaction capabilities.

SUMMARY OF THE INVENTION

The above object generally is accomplished by the invention wherein a first stage of the deployment, a first airbag is provided, which has a specified shape and is supplied with a specified quantity of gas from a gas source such that, in the state in which the bag is filled with the quantity of gas, it has a collision zone that corresponds to the diameter of the steering wheel, and a short expansion length in the direction of the passenger relative to the distance between the collision zone and the passenger. The first, small airbag thus constitutes only a flat cushion that covers the steering wheel in the direction of the driver, and only insignificantly limits the driver's visibility in a predetermined viewing region, and allows the driver to continue steering the vehicle.

According to the invention a second airbag likewise is provided for an independent second staghe of deployment that follows the first. This airbag enlarges the collision zone, and is therefore only deployed in the event of a particularly severe accident. The first and second airbags are deployed independently of one another, preferably with a time offset or, if the acceleration thresholds are exceeded one immediately after the other, as closely together as possible. Advantagous modifications of the basic invention are disclosed.

In the filled state, the second airbag laterally adjoins the first airbag in the manner of a hose, surrounding it annularly, at least partially but preferably completely. Together, the two airbags form a second, larger collision zone. The second airbag is preferably filled with a higher gas pressure, which compresses the first airbag such that the expansion length of the first airbag increases in the direction of the driver, while the diameter or collision zone of the first airbag is naturally reduced. The second airbag can be filled with different gas quantities by a controllable gas source, preferably one that can be activated in stages. The shape of the two airbags and the deformation of the first airbag can therefore be set.

Elastic shaping elements, such as restraining straps, in the first airbag permit the first airbag to be deformed and returned to its original shape when the outer, second airbag deflates and the gas pressure in the first airbag also drops.

The first airbag preferably has a slight deflation or a longer inflated period, which is why it can be deployed early and offer sustained protection. The second airbag, which is preferably only deployed if a second acceleration threshold is exceeded, offers the greatest possible protection, but deflates faster,,and therefore only briefly impedes the driver's visibility when deployed.

A passenger-protection apparatus of this type and a device for detecting the size and/or position of the passenger can be combined into a deployment method in which the first airbag is deployed particularly early when a first, very low, acceleration threshold is exceeded, regardless of the size and/or position of the passenger, and the second airbag is deployed, as a function of the size and/or position of the passenger, when a second, higher acceleration threshold is exceeded. The first airbag protects the passenger without endangering him in "out-of-position" situations, and without impeding visibility. The detection device has sufficient time for deciding whether and to what extent the second airbag will be deployed.

DESCRIPTION OF THE PREFERRED EMBODIMENTS

FIGS. 1a through 1d show the expansion of the airbag apparatus over time, in a plurality of stages.

Figure 1D:
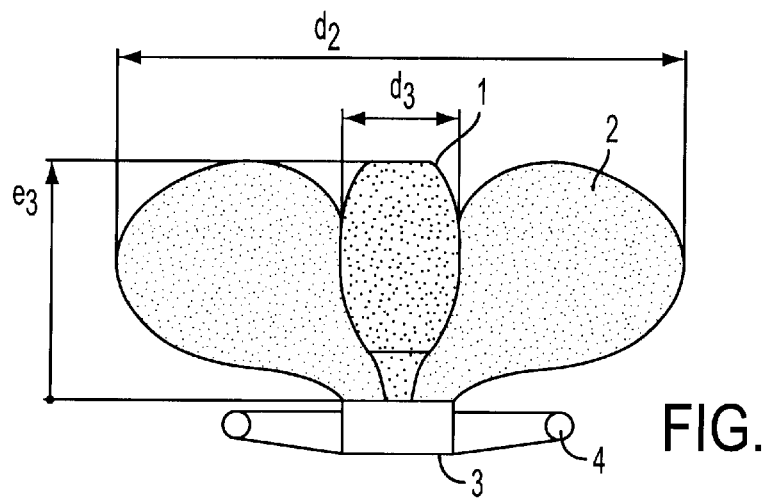
FIGS. 1a to 1d show an airbag apparatus having two airbags, and their stage-wise expansion.
Figure 1C:
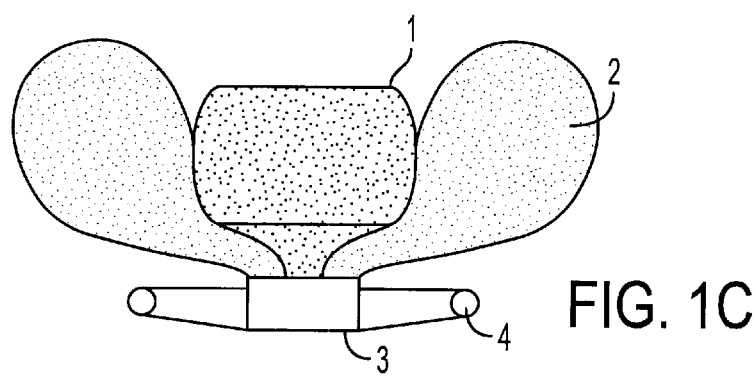
Figure 1B:
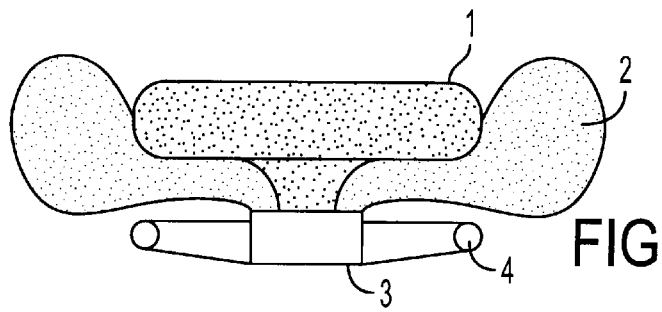
Figure 1A:
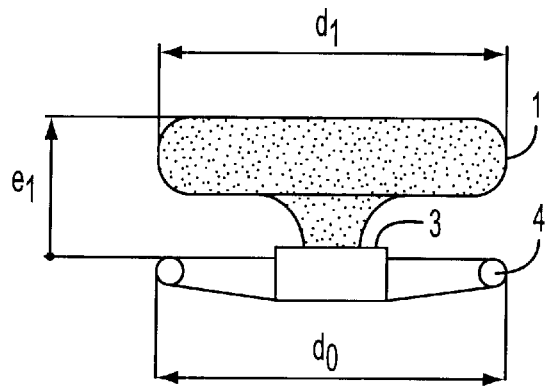

FIG. 1a shows the shape of the first airbag 1 when it is immediately deployed after a pre-crash sensor has detected an unavoidable accident, for example, or a crash sensor mounted to the vehicle shell has been tripped, or the acceleration signal has exceeded the first acceleration-dependent threshold. The shape and the quantity of gas supplied by the gas source 3 are determined such that, when the first airbag 1 is filled with this gas quantity, it covers a small collision zone, namely a diameter d1 that corresponds to the steering wheel 4, and has a short expansion length e1 in the direction of the driver, relative to the distance between the steering wheel and the driver.

In comparison to the earlier, spherical airbags known from the state of the technology, an expansion length in a range of a few centimeters, such as 5, 10 or 15 cm, is an objective.

Because the diameter d1 of the first airbag approximately corresponds to the diameter of the steering wheel d0 in this stage, and the expansion length e1 is correspondingly small, the first airbag already protects the driver from impacting the steering wheel, without posing a threat to small individuals or to those in atypical sitting positions. Moreover, the driver can continue to observe the traffic situation and steer the vehicle, as shown in detail in FIG. 3. This first airbag has a long inflated period, i.e., it only deflates slightly right away, so determining the time of the deployment of the first airbag is more flexible and less critical for the protective effect.

FIGS. 1b through 1d illustrate the stage-wise deployment of the second airbag 2, which surrounds the first airbag 1 annularly on all sides, when a second acceleration-dependent threshold is exceeded in this example. The airbag 2 thus increases the diameter D2 of the collision zone, and additionally heightens the protective effect due to the stage-wise increase in the expansion length of the first and/or second airbag, as shown in FIG. 1, with the expansion length e3 being clearly visible. FIGS. 1b through 1d show that the second airbag 2 compresses the first airbag 1 due to a higher gas pressure, thereby increasing the expansion length of the first airbag 1 from e1 to e3 in the direction of the driver. In the process, the diameter of the first airbag 1 shrinks from d1 to d3. In principle, this method of filling the airbags 1 and 2 is possible with a gas source 3, for example from a compressed-gas container, provided that the supplied quantity of gas and the airbag to be filled are controlled by valves.

Even small individuals, or those assuming atypical sitting positions, are in no way endangered by the deployment of the second airbag, as in the state of the technology, because the lateral, outside arrangement of the second airbag does not represent a direct threat to these persons, and the increase in the expansion length through the compression of the first airbag is effected to a significantly lesser extent, with a delay and more slowly.

Elastic shaping elements in the first airbag permit an adaptation of their length to the respective expansion length e1–e3 of the first airbag, and can additionally reverse the deformation of the first airbag when the gas pressure in this airbag decreases again.

In principle, the embodiment with a small first airbag and a second airbag that compresses the first airbag can also be implemented in other protection regions, such as for the passenger. In this case as well, a first airbag with a short expansion length can be expanded as a flat cushion with, for example, a rectangular collision zone in front of the dashboard region, the bag being supplemented and compressed by a second airbag that surrounds the first one in the manner of a hose, for example in the form of a hose on the top that leads to the windshield, and a hose that leads to the knee region, so the expansion length of the first airbag is also correspondingly increased. The cross section corresponds extensively to the cross section illustrated in FIG. 1.

Figure 2:
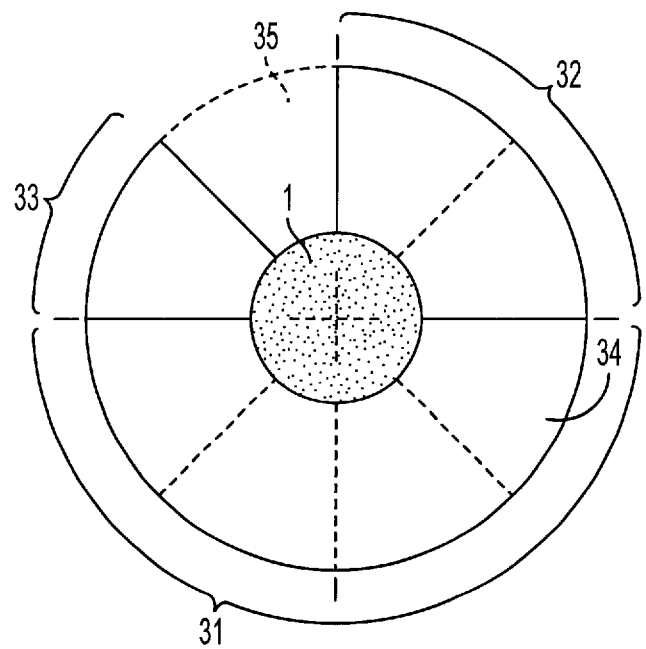
FIG. 2 shows a gas source comprising a plurality of stages that can be deployed independently of one another, for an airbag apparatus according to FIG. 1.

Pyrotechnically-deployable gas generators are often used for airbags, so FIG. 2 includes a gas source having a plurality of stages 30, 31, 32, 33, which can be deployed independently of one another and are in separate combustion chambers that are connected to the respective airbag 1, 2 by way of corresponding discharge openings. For example, the inside stage 30 serves as a first gas source for deploying the first airbag. The stages 31, 32 and 33 serve in deploying the second airbag 2, with the independently-deployable stages 31, 32, 33 permitting the gas pressure in the second airbag 2 to be purposefully adapted, and, in particular, the expansion length (e1 through e3) of the first airbag 1 to be controlled by these stages of the second airbag. The combustion chambers of the stages 31, 32 and 33 lead into the common airbag 2.

The stages 31, 32, 33 are advantageously constructed from segments 34, and have a binary graduation: The stage 31 contains four segments 34, the stage 32 contains two segments and the stage 33 contains one segment, so a total of seven different gas quantities can be produced in the second airbag 2. The free segment 35 serves in, for example, supplying the ignition line.

Figure 3:
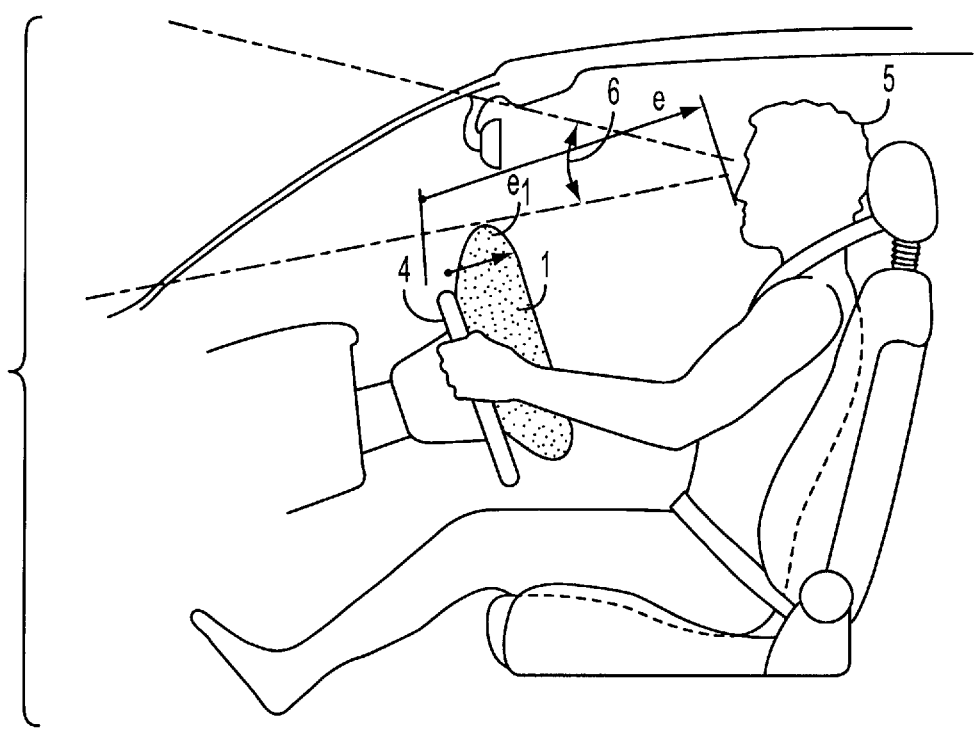
FIG. 3 shows the driver space when the first airbag is deployed.

FIG. 3 illustrates the interior of a vehicle with the driver 5 and the steering wheel 4; the acceleration signal detected in the vehicle has already exceeded the first acceleration threshold, so the first airbag 1 has been deployed. It can be seen clearly that the shape and the gas quantity of the first airbag 1 are selected such that the viewing region 6 of the driver is only slightly limited, and the driver has early protection against impacting the steering wheel 4. Small and "out-of-position" persons are also not injured by the deployment of the first airbag, with its small expansion length, but are instead adequately protected against a collision. The expansion length e1 of the first airbag 1, which is short relative to the distance e between the steering wheel and the driver, can be created by the varying elasticity of the airbag in the front and side regions, or by internal shaping by the straps, when the second airbag is deployed and compresses the first airbag due to the increasing gas pressure in the first airbag 1 as well; the shaping straps tear, or preferably deform elastically so as to be restored, thereby permitting the deformation shown in FIG. 4.

Figure 4:
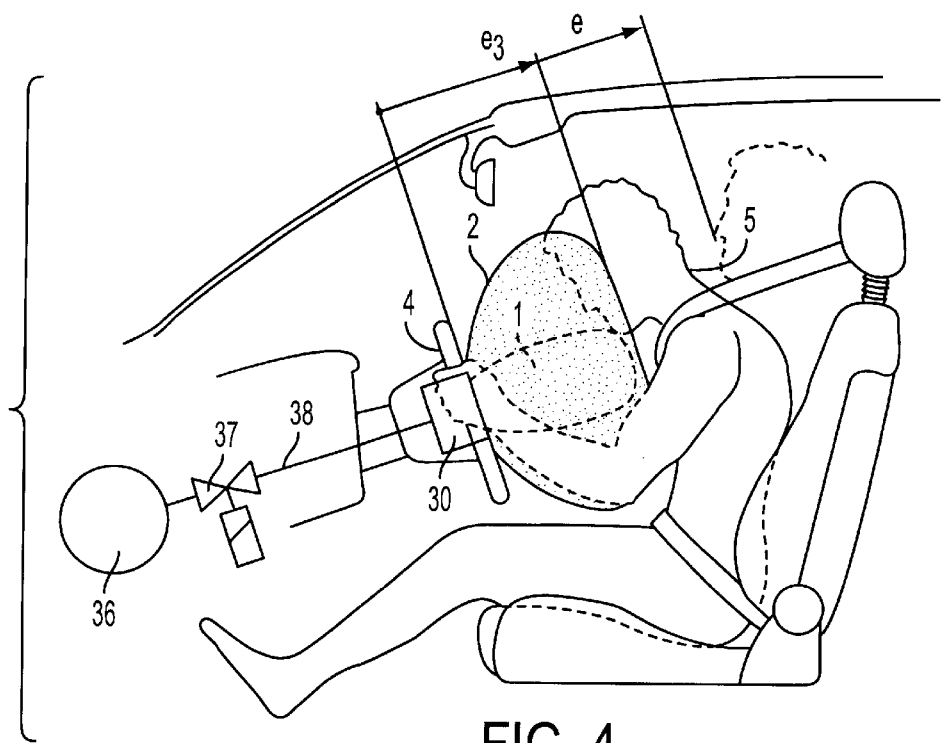
FIG. 4 shows the driver space after the second stage has been deployed.
Figure 5:
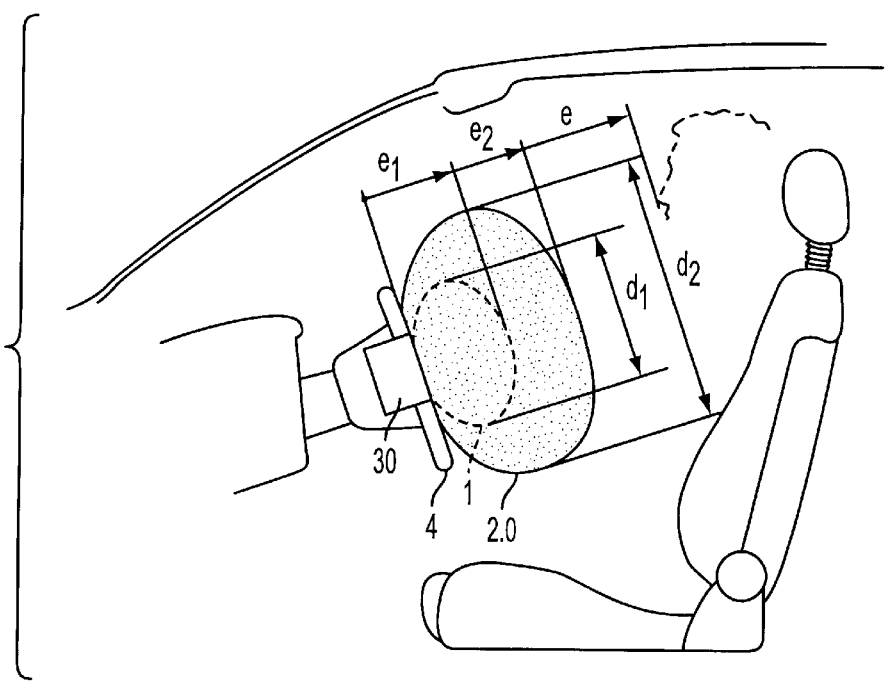
FIG. 5 shows a dual-airbag passenger-protection apparatus according to DE 92 11 421 U1.

FIG. 4 shows the deployment of the second airbag 2 in the manner shown in FIG. 1, with the expansion length being increased to E3, in addition to the increase in the diameter of the protected region, and therefore assuming the shape of a conventional airbag instead of that of a flat cushion, like the airbag 1 in FIG. 3, which assures the greatest possible protection for the passenger. It is also basically conceivable to control the expansion lengths of the first and second airbags in stages, as a function of the unimpeded expansion in the passenger space, as can be inferred from another airbag embodiment in DE 197 03 945 A1. FIG. 4 also illustrates that, for this example, the gas source 30 of the first airbag was disposed in the steering wheel 4, but the gas source of the second airbag 2 was formed by a compressed-gas container 36 outside of the passenger space, and this compressed-gas container is connected by a valve 37 and a pressure line 38 to the second airbag, with corresponding discharge openings leading the compressed gas into the second airbag 2.

Figure 6:
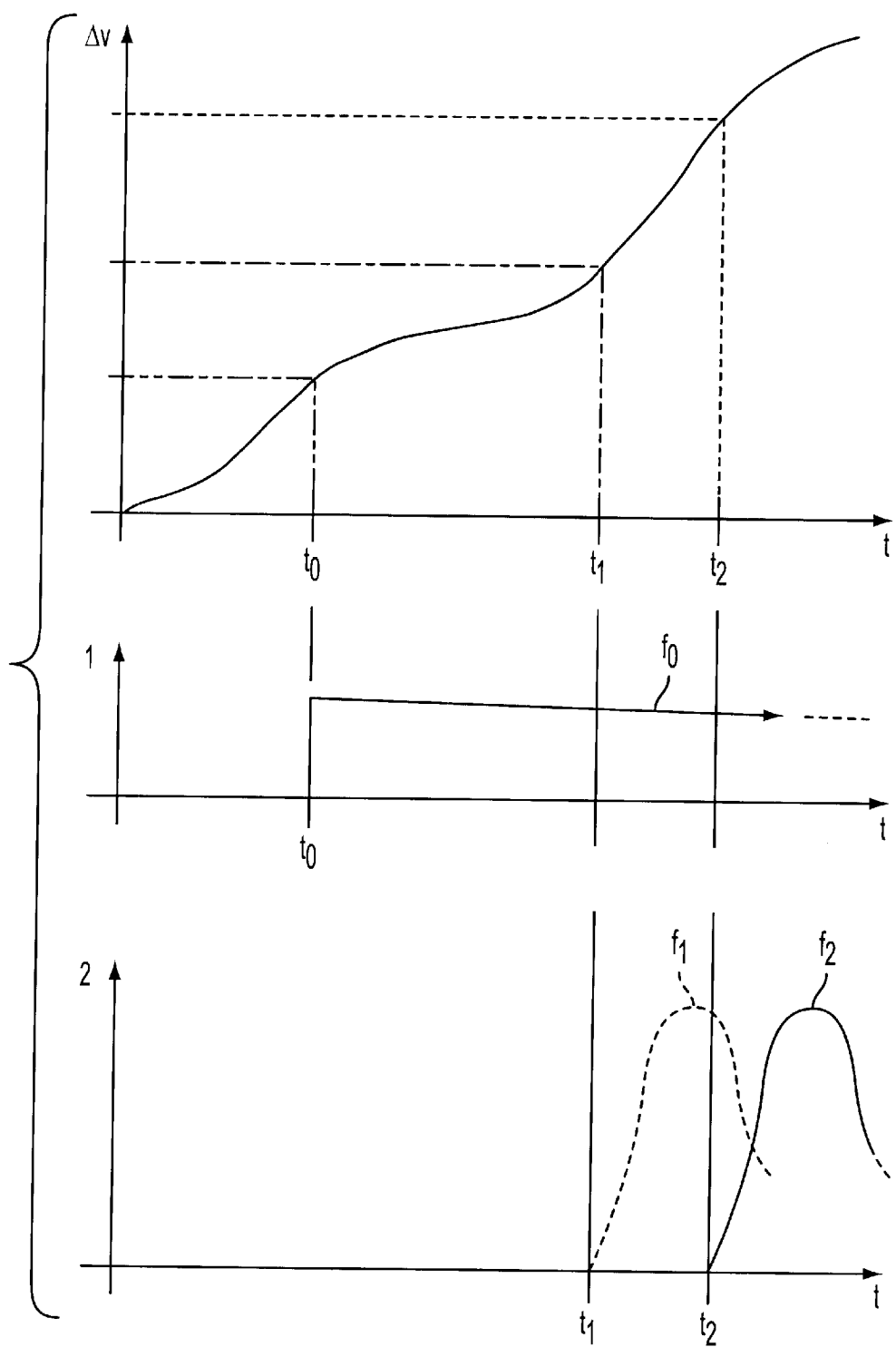
FIG. 6 shows the deployment process over time, in compliance to the state of the technology.

FIG. 6 depicts the temporal course of the method for deploying such a passenger-protection apparatus with the use of a device for detecting the size and/or position of the passenger.

In the state of the technology, an acceleration-dependent threshold $\Delta v_1$ must be used for deploying an airbag, because the large airbags that are normally used in the state of the technology have a large volume, but also a rapid deflation or short inflated period. The size and/or the position of the passenger must be accounted for, because otherwise he may be injured by the airbag.

In contrast, the use of a passenger-protection apparatus that includes a first and a second airbag, the second one surrounding the first one laterally, permits the early deployment of the airbag at t0, when a first acceleration-dependent threshold $\Delta v_0$ is exceeded, regardless of the size and/or position of the passenger, because the small expansion length also does not endanger "out-of-position" passengers.

The second airbag is, of course, then deployed at a second, higher, acceleration-dependent threshold $\Delta v_2$, as a function of the size and/or position of the passenger. Considerably more time is available for choosing the degree of deployment of the second airbag up to t2 than is available in the state of the technology at t1.

The first airbag, in contrast, has a very long inflated period f0 for protecting the passenger not only early on, but for the duration of the accident, including a possible second collision situation, during which the second, surrounding airbag is deflated again, as clarified in f2.

What is claimed is:

1. A passenger-protection apparatus in the steering wheel (4) of a motor vehicle, having a control for deployment in the event of an accident, wherein a) a first airbag (1) is provided for a first stage of deployment, and a second airbag (2) is provided for a second stage of deployment that follows the first stage of deployment and is independent thereof; and b) the shape of the first airbag (1) and the quantity of gas supplied to it by a gas source (3) are determined such that, when filled with this quantity of gas, the first airbag (1) has a collision zone that corresponds to the diameter of the steering wheel (4), and has a short expansion length (e1<<e) in the direction of the passenger (6), in relation to the distance (e) between the collision zone and the passenger.

2. The passenger-protection apparatus according to claim 1, wherein the second airbag (2) at least partly surrounds the first airbag (1) laterally in the manner of a hose in the filled state, and the two airbags (1, 2) together form a second, larger collision zone.

3. The passenger-protection apparatus according to claim 2, wherein
   a) after the first airbag (1) is deployed, a first gas pressure dominates inside it, and after a second gas source (31, 32, 33, 36) has been activated, a higher, second gas pressure dominates inside the second airbag, and
   b) the shape of the second airbag (2) is formed around the first airbag (1) is such that the second airbag deforms the first airbag (1) with the higher gas pressure, and the expansion length (e1, e2, e3) of the first airbag (1) increases in the direction of the passenger (5) (e3>e2>e1).

4. The passenger-protection apparatus according to claim 3, wherein the second gas source has a plurality of independently-deployable stages (31, 32, 33), so the gas pressure in the second airbag (2) can be purposefully adapted.

5. The passenger-protection apparatus according to claim 4, wherein the expansion length (e1 through e3) of the first airbag can be controlled by the independently-deployable stages (31, 32, 33) of the second airbag.

6. The passenger-protection apparatus according to claim 3, wherein
   a) elastic shaping elements are provided in the first airbag, which
      a1) have a first length that corresponds to the short expansion length (e1) of the first airbag when the second airbag is not deployed, and
      a2) elastically increase to a second length when the first airbag (1) is deformed by the second airbag (2), and the expansion length (e1, e2, e3) of the first airbag (1) increases in the direction of the passenger (5), and
   b) the shape of the deformed first airbag (1) is restored when the gas pressure in the first airbag (1) drops again, with the elastic shaping elements returning to at least the first length from the second length.

7. The passenger-protection apparatus according to claim 3, wherein the first airbag (1) is smaller than the second airbag and has a significantly lesser deflation, or a longer inflated time, than the second airbag (2).

8. The passenger-protection apparatus according to claim 1, wherein the gas pressure in the second airbag can be adapted as a function of the size and/or position of the passenger.

9. The passenger-protection apparatus according to claim 1, wherein
   a) after the first airbag (1) is deployed, a first gas pressure dominates inside it, and after a second gas source (31, 32, 33, 36) has been activated, a higher, second gas pressure dominates inside the second airbag, and
   b) the second airbag (2) is formed and shaped around the first airbag (1) such that the second airbag with its higher gas pressure deforms the first airbag to cause the expansion length (e1, e2, e3) of the first airbag to increase in the direction of the passenger (5) (e3>e2>e1).

10. The passenger-protection apparatus according to claim 9, wherein the second gas source has a plurality of independently-deployable stages (31, 32, 33), so the gas pressure in the second airbag (2) can be purposefully adapted.

11. The passenger-protection apparatus according to claim 10, wherein the expansion length (e1 through e3) of the first airbag can be controlled by the independently-deployable stages (31, 32, 33) of the second airbag.

12. A passenger-protection airbag apparatus in the steering wheel of a motor vehicle, said apparatus comprising:
   a first airbag;
   a second larger air bag disposed behind the first airbag in a direction facing the steering wheel;
   a control means for triggering a gas source arrangement to sequentially deploy the first air bag followed by the second air bag independently of one another in the event of an accident; and wherein:
      the shape of the first airbag and the quantity of gas supplied to it by the gas source are determined such that, when filled with this quantity of gas, the first airbag has a collision zone that corresponds to the diameter of the steering wheel, and has a short expansion length (e1<<e) in the direction of a passenger, relative to the distance (e) between the collision zone and the passenger.

13. The passenger-protection apparatus according to claim 12, wherein the second airbag, in the deployed state, at least partly surrounds the first airbag laterally, and the two airbags together form a second, larger collision zone.

14. The passenger-protection apparatus according to claim 13, wherein:
   the gas source arrangement includes a first gas source that causes a first gas pressure to dominate within said first airbag after deployment, and a second gas source that, when activated, causes a higher, second gas pressure to dominate inside the second airbag; and
   the shape of the second airbag, which is laterally around the first airbag and the higher pressure therein causes the second airbag to deform the first airbag such that the expansion length (e1, e2, e3) of the first airbag increases in the direction of the passenger (e3>e2>e1).

15. The passenger-protection apparatus according to claim 14, wherein the second gas source has a plurality of independently-deployable stages so that the gas pressure in the second airbag can be purposefully adapted.

16. The passenger-protection apparatus according to claim 15, wherein the expansion length (e1 through e3) of the first airbag is controllable by the independently-deployable stages of the second airbag.

17. The passenger-protection apparatus according to claim 14, wherein:
   the first airbag is provided with elastic shaping elements that have a first length corresponding to the short expansion length (e1) of the first airbag when the second airbag is not deployed, and that elastically increase to a second length when the first airbag is deformed by the second airbag and the expansion length (e1, e2, e3) of the first airbag increases in the direction of the passenger, and,
   the elastic shaping elements cause the shape of the deformed first airbag to be restored when the gas pressure in the first airbag drops again, with the elastic shaping elements returning to at least the first length from the second length.

18. The passenger-protection apparatus according to claim 14, wherein control means causes the first airbag, which is smaller than the second air bag, to have a significantly lesser deflation, or a longer inflated time, than the second airbag.

19. The passenger-protection apparatus according to claim 12, wherein control means adapts the gas pressure in the second airbag as a function of at least one of the size and position of the passenger.

* * * * *